I. G. FOSLER.
GRAMOPHONE MOTOR AND THE LIKE.
APPLICATION FILED JUNE 5, 1917.
1,324,657.
Patented Dec. 9, 1919.
4 SHEETS—SHEET 1.
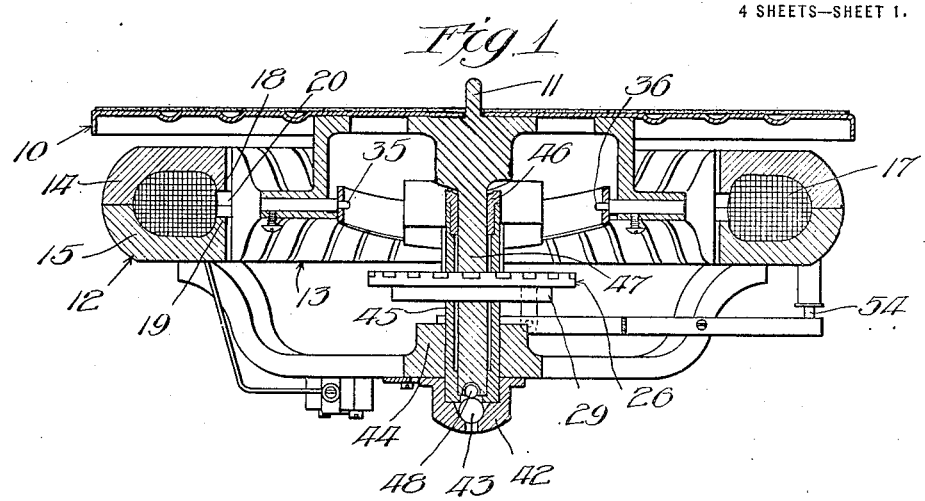
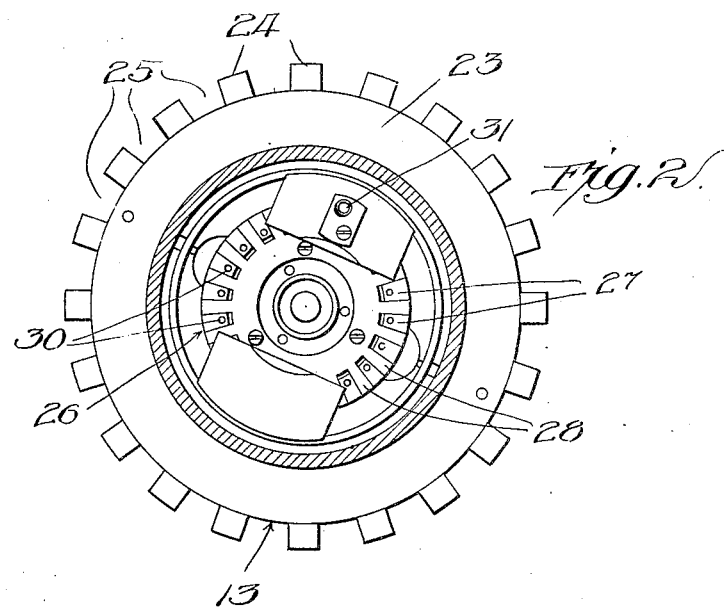
Witness:
Harry S. Gaither
Inventor:
Ira G. Fosler
by Banning & Banning
Attys

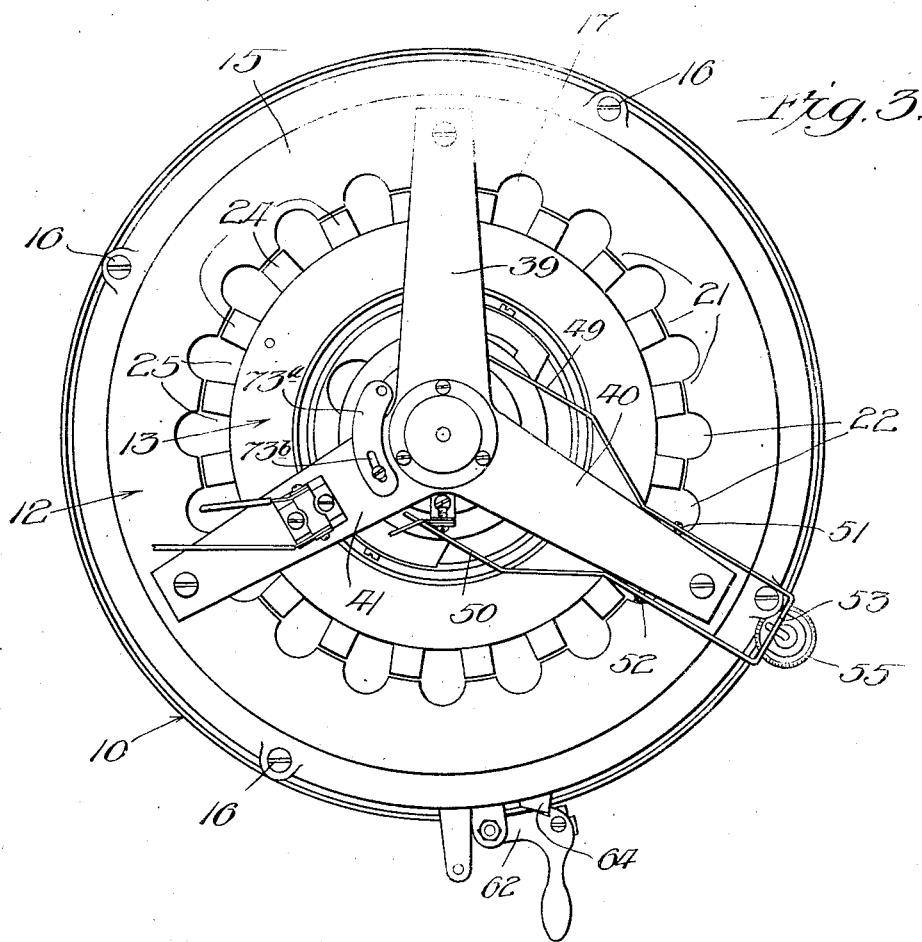

I. C. FOSLER.
GRAMOPHONE MOTOR AND THE LIKE.
APPLICATION FILED JUNE 5, 1917.

1,324,657.

Patented Dec. 9, 1919.
4 SHEETS—SHEET 3.

Inventor:
Ira C. Fosler

Witness:
Harry S. Gaither

I. G. FOSLER.
GRAMOPHONE MOTOR AND THE LIKE.
APPLICATION FILED JUNE 5, 1917.
1,324,657.
Patented Dec. 9, 1919.
4 SHEETS—SHEET 4.
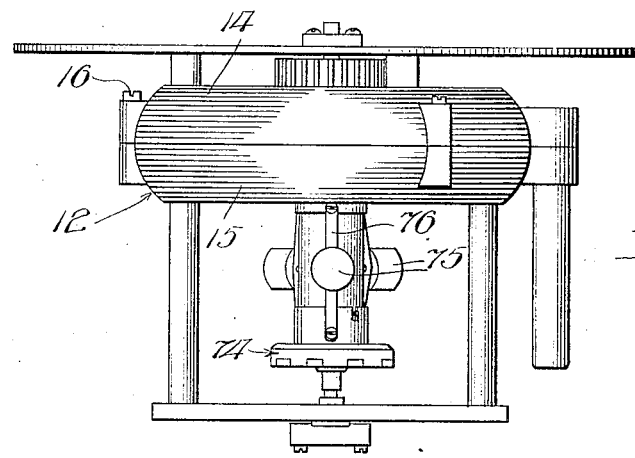
Fig. 8.
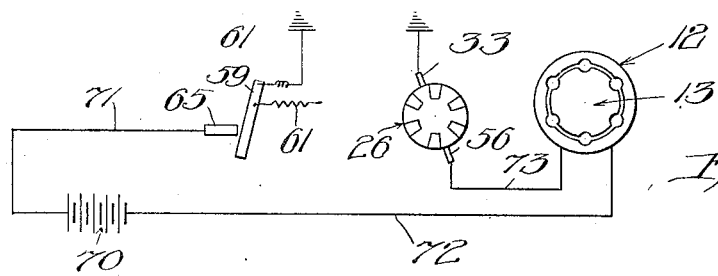
Fig. 7.
Fig. 9.
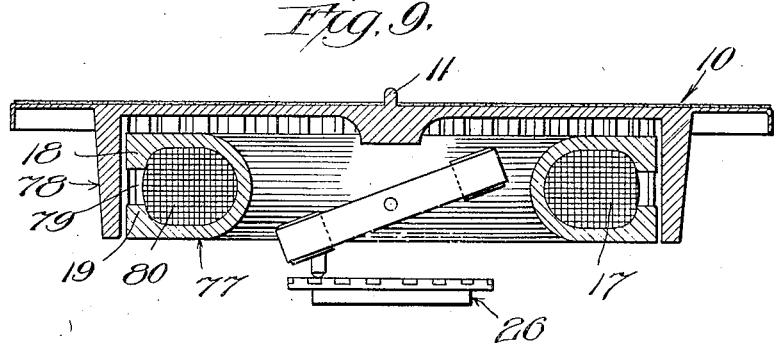
Witness:
Harry S. Gaither
Inventor:
Ira G. Fosler
by Banning & Banning
Attys

UNITED STATES PATENT OFFICE.

IRA G. FOSLER, OF CHICAGO, ILLINOIS.

GRAMOPHONE-MOTOR AND THE LIKE.

1,324,657.  Specification of Letters Patent.  Patented Dec. 9, 1919.

Application filed June 5, 1917. Serial No. 173,005.

*To all whom it may concern:*

Be it known that I, IRA G. FOSLER, a citizen of the United States, residing at Chicago, county of Cook, and State of Illinois, have invented certain new and useful Improvements in Gramophone-Motors and the like, of which the following is a specification.

The present invention has to do with certain improvements in motors for gramophones and the like, by means of which the turn-tables of the gramophones are rotated. More particularly the invention has to do with certain improvements in electric motors for this purpose.

There have in the past been devised various forms of electric motor for driving gramophone turn-tables, but, as far as I am aware, such motors have been so constructed that the driving of the turn-table was effected through the medium of gearing or belting, the motor running at a greater speed than the speed of the turn-table.

Furthermore, the regulation of these machines has generally been effected through the medium of some form of friction device, the friction governor being so constructed that, when the desired speed is reached, a sufficient friction will be generated to prevent any further increase in speed. This type of regulator is necessarily imperfect in its action and more or less irregular depending upon the condition of the friction surfaces.

One of the objects of the present invention is to provide a direct drive motor for driving the gramophone turn-table, thereby eliminating entirely any irregularities of action occasioned by the interposition of gearing or belting, and also eliminating any noise or disturbance of this kind such as usually accompanies the use of geared or belted connections. By reason of the use of the direct drive principle, it follows that the machine must be of relatively slow speed operation, its speed being equal to the speed of the turn-table. Therefore, another feature of the invention has to do with the provision of a motor whose characteristics are fundamentally or essentially such that it can be satisfactorily used at the relatively low speed of the turn-table notwithstanding its small size and capacity.

Another object of the invention is to provide a motor of such construction that an extremely uniform speed of rotation may be maintained. In this case, an object is to provide a type of governor or speed regulator, whereby a very close and perfect regulation may be secured without the use of friction brake devices.

Other objects and uses of the invention will appear from a detailed description of the same which consists in the features of construction and combinations of parts hereinafter described and claimed.

Referring to the drawings:

Figure 1 shows a vertical cross section through a motor embodying the features of the present invention;

Fig. 2 shows a top plan view of the rotor or rotating element of the motor shown in Fig. 1;

Fig. 3 shows a bottom view of the assembled motor shown in Fig. 1;

Fig. 7 shows diagrammatically an electric circuit showing one method of connecting up the motor to which the present invention relates;

Fig. 8 shows in elevation a modified construction of the motor embodying the features of the present invention; and Fig. 9 shows in vertical cross section another modified form of motor also embodying the features of the present invention.

Figure 4:
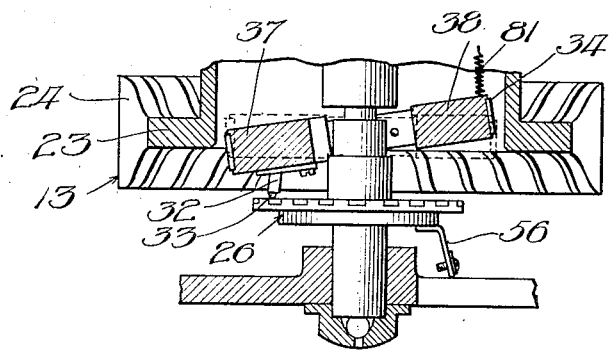
Fig. 4 shows a detailed cross section through the rotor and governing mechanism of the construction shown in Figs. 1, 2, and 3.

I will first describe the construction of motor shown in Figs. 1 to 6 inclusive. The turn-table illustrated therein is designated by the numeral 10. It is of the usual construction, having a central hole or perforation through which extends a centering pin or the like 11 upon which the disk is centered.

The motor comprises essentially the stator element 12 and the rotor element 13. The stator element is a circular ring of fairly high magnetic permeability, such as gray cast iron, of horse-shoe shaped cross section. In the construction shown in Figs. 1 to 6 inclusive, the open side of the horse-shoe faces inwardly, whereas, in the construction shown in Figs. 8 and 9, said open side faces outwardly. In the construction shown in Figs. 1 to 6, the ring 12 comprises upper and lower sections 14 and 15, respectively, which are held together by a series of bolts or screws 16 passing through lugs in the peripheries of the sections. Within the space between the sections 14 and 15 lies a circular magnetizing coil 17, so that upon passing an electric current through the same the inner edge 18 of the stator will assume one polarity, for example, north, while the other edge will assume the other polarity, for example, south. By so constructing the sections 14 and 15 as to provide the annular opening or space 20 between the edges 18 and 19, the aforesaid poles will assume definite form and distinction.

Figure 5:
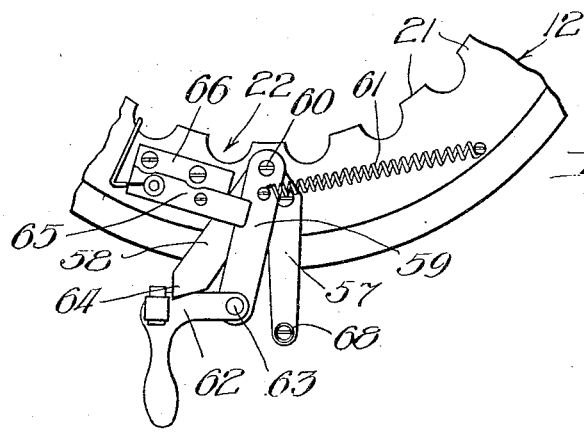
Fig. 5 shows a fragmentary plan view of the brake and switch mechanism in running position.
Figure 6:
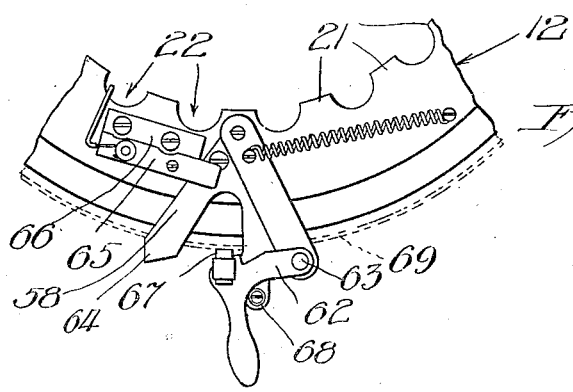
Fig. 6 shows a view corresponding to Fig. 5, with the exception that the parts are in braking position.

As shown particularly in Figs. 3, 5, and 6, the edges 18 and 19 are serrated or toothed to provide the teeth 21 of equal spacing around the inner periphery of the stator. Between these teeth are the notches or recesses 22. Consequently the north and south polarities aforesaid will be concentrated on these teeth and thus still further emphasized.

Within the stator is rotatably mounted the rotor 13 which has been previously mentioned. This rotor comprises a ring of material of relatively high permeability 23 having the peripheral vertically lying teeth 24. Between these teeth are the slots 25. The teeth 24 of the rotor correspond exactly in number with the teeth 21 of the stator, and, furthermore, the teeth 24 are of such height as shown in Fig. 1 that they overlie or span the upper and lower portions 18 and 19 of the teeth 21 of the stator. Consequently, as the rotor rotates, the teeth 24 will assume alternately a position such as that shown in Fig. 3, in which the sets of teeth register exactly, and intermediate positions in which the teeth 24 lie in front of the recesses 22 of the stator. During each complete revolution of the rotor there will be as many registrations as there are teeth on the rotor.

If, when the teeth of the rotor lie in positions intermediate the teeth of the stator, the coil 17 of the stator be energized, then the teeth 24 of the rotor will be attracted toward the adjacent stator teeth, and there will be a tendency of the rotor to rotate in that direction dictated by the greatest pull. For example, if the rotor teeth lie closer to the stator teeth looking in the clockwise direction, then the tendency will be for the rotor to commence rotation in the clockwise direction; and on the other hand, the tendency will be to rotate in the counter-clockwise direction if the rotor teeth stand closer to the stator teeth looking in the counter-clockwise direction. Assuming that the coil 17 has been energized as just explained, the rotor will swing around until the poles register as shown in Fig. 3. If the energizing of the coil 17 were then to be continued, the rotor would be locked in that position. If, however, the current be cut off from the coil 17 just about the time that the teeth come into registry, the momentum of the rotor willl carry it past such registry and into a position where, upon again energizing the coil 17, the pull will continue to rotate the rotor in that same direction. Thus by a series of properly timed or synchronized electrical impulses on the coil 17, it will be possible to cause a continuous rotation of the rotor.

This timing of the impulses is secured by the use of a commutator or make and break device 26. The same is circular in form and has embedded in its upper surface the segmental contacts 27 with the intermediate insulating portions 28. A convenient form of construction is that illustrated in which the make and break device is formed of a single piece of fiber or the like having the contacts 27 embedded in its upper surface. Beneath the fiber block is a ring 29 of conducting material which is connected to each of the contacts by a pin or the like 30, as shown in Fig. 2.

The commutator 26 stands stationary, while a suitable contact on the rotor travels around its upper surface. This is the contact 31 shown in Figs. 2 and 4. The same comprises a tubular portion 32, wherein is mounted a contact pin 33 which is forced outwardly from the tubular portion 32 under spring pressure, so that the pin 33 rides easily over the contacts.

The tubuar member 32 and pin 33 are carried by a centrifugal governor which rotates with the rotor. This centrifugal governor comprises a ring 34 pinned to the rotor at the points 35 and 36, so that the ring is compelled to rotate with the rotor, but may tilt or swing about a horizontal axis. On opposite sides of the ring 34 are the weights 37 and 38. The tubular member 32 is conveniently connected to one of these weights and consequently rotates with it. The pivot points 35 and 36 are so mounted that the weight normally stands in tilted position shown in Fig. 4, in which it appears that the horizontal plane, including the center of gravity of the ring and weights, lies below the horizontal plane of the pivot points, and, therefore, it appears that the vertical plane of the center of gravity of the ring and weights lies closer to the vertical plane of the pivot points than would be the case if the ring were to swing into the dotted line position of Fig. 4. Therefore, as soon as rotation commences, there will be a tendency for the ring and weights to swing into the dotted line position and thus raise the contact pin 33 away from the commutator. By setting the commutator at the proper elevation, this rising of the pin will occur at the desired speed, thereby opening the circuit, and thus preventing any further increase of speed.

The stator carries a spider or frame having the arms 39, 40, and 41, which are joined together at the inner ends. At their point of juncture these arms carry a ball cup 42 in which is socketed a bearing ball 43. Extending upwardly from the point of juncture 44 of the arms is a tube 45 at the upper end of which is a bearing sleeve 46. The rotor has a downwardly depending shaft or pin 47, the lower end of which rests on a small ball 48 which in turn rests on the ball 43. The balls 43 and 48 carry the weight of the rotating element, whereas the sleeve 46 serves to center the upper portion of the shaft 47 and thus keep the rotor accurately centered with respect to the stator.

The commutator 26 is slidably mounted on the tube 45 and can be raised and lowered along said tube. For this purpose, I have provided a pair of arms 49 and 50 best shown in Figs. 1 and 3 which are pivoted to the arm 40 at the points 51 and 52. The outer ends of the arms 49 and 50 are joined together by the cross piece 53 and their inner ends rest beneath the commutator 26 and support the same. The cross piece 53 connects to a pin 54 which may be adjusted vertically through the medium of a thumbscrew 55, thereby adjusting the elevation of the commutator, according to the desired speed of rotation.

As a convenient form of construction, the ring 29 of the commutator carries a terminal lug or connector 56 to which one of the wires of the circuit may be connected. In order to simplify the construction, the other side of the circuit is grounded, the tubular member 32 and contact pin 33 being directly connected to the metal of the centrifugal governor which in turn is grounded.

The switch and brake are shown in detail in Figs. 5 and 6. A U-shaped member having the arms 57 and 58 is rigidly connected to the stator. A lever arm 59 is pivoted to the stator at the point 60, a spring 61 tending to draw said lever to the right to thereby open the circuit and set the brake. A hooked finger 62 is pivoted to the end of the arm 59 at the point 63, said hooked finger being provided with a notch to receive the pointed end 64 of the arm 58. When the arm 59 is drawn over into the position shown in Fig. 5 and hooked in such position against the tension of the spring 61, it engages a contact finger 65 mounted on an insulating block 66. On the contrary when the arm 59 is drawn over into the position shown in Fig. 6, it disengages from the contact finger 65 and thereby opens the circuit. The finger 62 carries a friction block 67. A pin and roller element 68 stands up from the end of the arm 57, so that when the arm 59 is drawn over by the spring 51 the arm 62 will be swung inwardly and thus the friction block 67 will be forced against the flange 69 of the turntable, to thereby set the brake.

Referring to Fig. 7, I will now explain the electrical circuits therein illustrated. A dry cell or battery 70 is shown for supplying current to the system. One terminal of the battery connects by a line 71 with the contact 65 and the other terminal connects by a line 72 with one side of the coil 17. The other side of the coil connects by a line 73 with the terminal lug 56 of the commutator. The contact pin 33 is grounded onto the frame of the machine and the arm 59 is grounded onto the frame of the machine at the pivot point 60. Consequently, when the arm 59 is closed against the contact 65, one side of the battery is grounded onto the frame of the machine, and thus may be considered as being directly connected to the contact pin 33. It will be understood that, in order to get the correct timing of the electrical impulses, the commutator must bear a definite angular relationship to the teeth of the stator. I have, therefore, provided an arm 73ª connected to the lower portion of the commutator and having a pin and slot connection 73ᵇ by which the commutator may be adjusted back and forth a desired amount with respect to the stator so as to give the exact timing of electrical impulses desired.

It is thought that the operation of the device will be sufficiently understood from the description which has gone before.

In the modified construction shown in Fig. 8, the same principles of construction and operation are found, but the centrifugal governor is modified to the extent that the opening of the circuit is occasioned by raising the commutator 74 away from a fixed contact pin. This is occasioned by the use of a series of centrifugal fly-balls 75 mounted on the spring strips 76 in the well understood manner.

The modified construction shown in Fig. 9 is very similar to that shown in Figs. 1 to 6 inclusive, but in the present case the positions of the stator and rotor have been reversed. In the arrangement shown in Fig. 9, the stator 77 is located inside of the teeth 78 of the rotor, the slotted opening 79 of the stator facing outwardly. This arrangement presents the advantage over the arrangement previously described in this that the winding 80 can be laid into the stator directly through the slotted opening 79, so that it is unnecessary to make the stator of two parts as in the construction previously described.

I wish to point out the fact that, in many cases, it may be desirable to make use of a condenser in connection with the make and break circuit device so as to eliminate sparking, or, at any rate, cut down the amount of sparking. When a condenser is to be used the terminals of the same may be connected across the terminals of the make and break device, or they may be connected across the circuit gap plus a portion (for example, one-half) of the coil 17. I have found by experiment that this latter arrangement is a very desirable one, and in fact it eliminates the sparking to a greater degree than is the case where the condenser is connected directly across the terminals of the commutator.

The switch and brake device are so constructed that, at the instant of closing the electric circuit, a mechanical impulse is given to the turn-table so as to start rotation of the same in the correct direction. This fact will be readily appreciated from an examination of Fig. 6, wherein it will appear that, upon quickly throwing the finger piece of the arm 62 to the left so as to close the circuit, the friction block 67 will give the turn-table an impulse in the same direction so as to start its rotation. This feature is a very desirable one, because the machine will not naturally or automatically commence to rotate unless perchance it should stop in such a position that the contact pin 33 was in contact with one of the bars of the make and break device.

Examination of Fig. 4 will reveal the presence of a small spring 81 having one end connected to the centrifugal governor, and having its other end connected to the material of the rotor. This spring tends to tilt the governor into the full line position of Fig. 4, and, therefore, assists the operation of the governor.

While I have herein shown and described only certain forms of construction embodying the features of the present invention, still it will be understood that I do not limit myself to the said forms, except as I may do so in the claims.

I claim:

1. In a motor, the combination of circular rotor and stator elements and having sets of polar teeth adapted to periodically assume registering and non-registering magnetic positions as the stator and rotor relatively rotate, a magnetizing coil for the teeth of one of said elements, a device for simultaneously permitting an intermittent flow of current to the coil and limiting the speed of rotation of the rotor, said device comprising a vertically adjustable circular non-rotatable plate axially centered with respect to the axis of rotation of the rotor, and having successive points of electrical contact and insulation corresponding in number to the polar projections, an arm swingingly mounted with respect to said plate and adapted to swing on a horizontal axis and travel in a horizontal plane with the rotations of the rotor, and at the same speed as the rotor, a contact point on said arm adapted to normally contact with and travel over the surface of the plate and its points of insulation and electrical contact, means for adjusting the elevation of the plate with respect to the horizontal axis on which said arm swings, and suitable electric circuits including the magnetizing coil, traveling contact point, and points of contact on the plate, substantially as described.

2. In a motor, the combination of a circular rotor and stator elements and having sets of polar teeth adapted to periodically assume registering and non-registering magnetic positions as the stator and rotor relatively rotate, a magnetizing coil for the teeth of one of said elements, a device for simultaneously permitting an intermittent flow of current to the coil and limiting the speed of rotation of the rotor, said device comprising a vertically adjustable circular non-rotatable plate axially centered with respect to the axis of rotation of the rotor, and having successive points of electrical contact and insulation corresponding in number to the polar projections, an arm swingingly mounted with respect to said plate and adapted to swing on a horizontal axis, and traveling in a horizontal plane with the rotations of the rotor, and at the same speed as the rotor, a contact point on said arm adapted to normally contact with and travel over the surface of the plate and its points of insulation and electrical contact, and suitable electric circuits including the magnetizing coil, traveling contact point, and points of contact on the plate, substantially as described.

IRA G. FOSLER.